United States Patent
Sirin et al.

(10) Patent No.: US 11,694,822 B2
(45) Date of Patent: Jul. 4, 2023

(54) MEDIUM VOLTAGE ELECTRIC CABLE WITH IMPROVED BEHAVIOR UNDER FIRE

(71) Applicant: Prysmian S.p.A., Milan (IT)

(72) Inventors: Zekeriya Sirin, Bursa (TR); Bilal Ozdemir, Bursa (TR); Serdar Büyük, Bursa (TR)

(73) Assignee: Prysmian S.p.A., Milan (IT)

(*) Notice: Subject to any disclaimer, the term of this patent is extended or adjusted under 35 U.S.C. 154(b) by 0 days.

(21) Appl. No.: 17/558,802

(22) Filed: Dec. 22, 2021

(65) Prior Publication Data

US 2022/0199289 A1 Jun. 23, 2022

(30) Foreign Application Priority Data

Dec. 23, 2020 (IT) .................. 102020000032015

(51) Int. Cl.
*H01B 7/295* (2006.01)
*C08K 3/34* (2006.01)
*C08K 9/04* (2006.01)
*H01B 3/44* (2006.01)

(52) U.S. Cl.
CPC .............. *H01B 7/295* (2013.01); *C08K 3/346* (2013.01); *C08K 9/04* (2013.01); *H01B 3/441* (2013.01)

(58) Field of Classification Search
CPC ........ H01B 3/185; H01B 3/305; H01B 3/421; H01B 3/441; H01B 7/02; H01B 7/704; H01B 7/06; H01B 7/29; H01B 7/295; H01B 7/2806; H01B 7/2825; C08C 19/32; C08C 15/02; C08C 101/00; C08C 28/006; C08K 3/346; C08K 9/04

USPC ............ 174/110 R, 110 SR, 120 R, 120 SR, 174/120 AR; 428/458, 331, 461, 463, 428/560

See application file for complete search history.

(56) References Cited

U.S. PATENT DOCUMENTS

| | | | |
|---|---|---|---|
| 6,998,536 B2 | 2/2006 | Barusseau et al. | |
| 7,504,451 B1 | 3/2009 | Brown et al. | |
| 10,217,546 B2 * | 2/2019 | De Martino | H01B 7/2806 |

(Continued)

FOREIGN PATENT DOCUMENTS

| | | |
|---|---|---|
| CN | 111415773 A | 7/2020 |
| CN | 111533987 A | 8/2020 |

(Continued)

OTHER PUBLICATIONS

Search Report dated Aug. 31, 2021 in Italian Patent Application No. 202000032015, 2 pages.

*Primary Examiner* — William H. Mayo, III
(74) *Attorney, Agent, or Firm* — Element IP, PLC

(57) ABSTRACT

A medium voltage electric cable having a conductor, an inner semi-conductive layer, an insulating layer, an outer semi-conductive layer, a wire metal screen, a filler layer made from an extruded elastomeric low smoke zero halogen (LSOH) composition containing a polyethylene homopolymer and/or copolymer having a density lower than 0.93 g/cm³ and a metal hydroxide, and an outer sheath made from a low smoke zero halogen (LSOH) composition containing a polymer mixture of an EVA polymer and polyethylene homopolymer and/or copolymer having a density lower than 0.93 g/cm³, the polymer mixture being charged with a metal hydroxide and a phyllosilicate clay.

16 Claims, 1 Drawing Sheet

(56) References Cited

U.S. PATENT DOCUMENTS

| | | | | |
|---|---|---|---|---|
| 2003/0008158 | A1* | 1/2003 | Carrus | H01B 7/2825 |
| | | | | 428/458 |
| 2005/0045368 | A1 | 3/2005 | Keogh | |
| 2006/0269771 | A1* | 11/2006 | Cogen | D06M 15/227 |
| | | | | 252/604 |
| 2008/0093107 | A1* | 4/2008 | Amigouet | C09K 21/02 |
| | | | | 174/121 A |
| 2013/0220667 | A1* | 8/2013 | Millan Perez | C08L 23/08 |
| | | | | 174/120 SR |
| 2016/0362505 | A1* | 12/2016 | Adkinson | C08L 15/02 |
| 2019/0112230 | A1* | 4/2019 | Auvray | H01B 7/295 |

FOREIGN PATENT DOCUMENTS

| | | |
|---|---|---|
| GB | 2367064 A | 3/2002 |
| WO | WO-0203398 A1 | 1/2002 |
| WO | WO-2004066317 A1 | 8/2004 |
| WO | WO-2004066318 A1 | 8/2004 |
| WO | WO-2005062315 A1 | 7/2005 |
| WO | WO-2007048422 A1 | 5/2007 |
| WO | WO-08058572 A1 | 5/2008 |
| WO | WO-2008071237 A1 | 6/2008 |
| WO | WO-11092533 A1 | 8/2011 |

\* cited by examiner

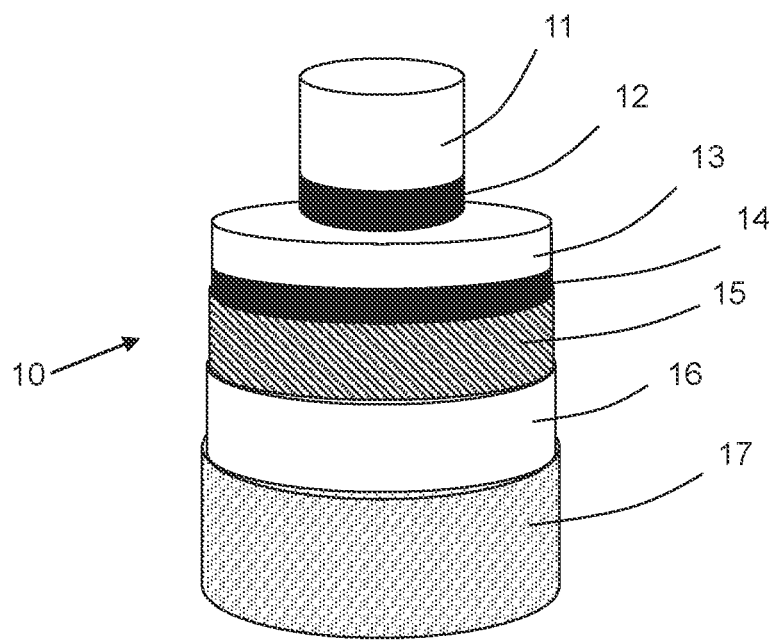

MEDIUM VOLTAGE ELECTRIC CABLE WITH IMPROVED BEHAVIOR UNDER FIRE

FIELD OF APPLICATION

The present disclosure relates to a medium voltage electric cable with improved behaviour under fire.

In particular, the present disclosure relates to a medium voltage electric cable which exhibits substantially no dripping (occurrence of flaming droplets) when exposed to high temperatures, e.g. in case of fire.

PRIOR ART

Electric cables used in industrial facilities, such as for example onshore and offshore plants, or used in public infrastructures, such as for example, underground lines, require to maintain operation of the facilities or infrastructures for a certain period of time to allow evacuation of the people before the fire breaks out.

Due to the increasing amount of equipment running on electricity in the industrial facilities and public infrastructures, particularly running on medium voltage, there is a need of having fire-resistant medium voltage electric cables.

Typically, medium voltage (MV) electric cables comprise a core and an outer sheath arranged in a radially outer position with respect to the core. The core comprises a conductor, an insulating system arranged in a radially outer position with respect to the conductor and a conductive screen arranged in a radially outer position with respect to the insulating system.

The insulating system typically includes a first semi-conductive layer arranged in a radially outer position with respect to the conductor, an insulating layer arranged in a radially outer position with respect to the first semi-conductive layer, and a second semi-conductive layer arranged in a radially outer position with respect to the insulating layer.

The fire-resistant performances of an electric cable can be assured by one or more fire-barrier layers provided, for example, around and in direct contact with the conductor, around the cable core and or as a part of the cable outer sheath.

For example, the MV electric cables may include a fire-barrier layer arranged in a radially outer position with respect to the conductive screen which is interposed between the conductive screen and the outer sheath.

In case of fire, a fire-barrier layer should display certain properties which can be evaluated by compliance with and certified by national and/or international standards. Particularly, international qualification standards require that electric cables have, in case of fire, limited flame spread and toxic smoke production, and low or no flaming droplet production. Such standards are more and more stringent about the performances required to a cable to the end of improving safety in case of fire.

One method for improving the behaviour under fire of electric cables such as MV cables is to provide them with a coating made of low-smoke and halogen-free (LSOH) materials obtained from a base polymer (e.g. polyethylene and/or polyethylene copolymers or derivatives, optionally cross-linked) filled with inorganic hydroxides fillers, such as magnesium hydroxide and/or aluminium hydroxide.

However, such LSOH materials just aid the fire-resistance of the cable by a flame-retardant action and does not prevent the formation of flaming droplets when the cable is exposed to high temperatures e.g. in case of fire. In addition, high contents of fillers are required for obtaining suitable flame-retardant properties which can result in a decrease of the mechanical properties of the cable coating.

As a result, many MV electric cables exhibit suitable performances under fire, particularly in connection with droplets generation during burning, such as to obtain certification only in lower classes of current international standards, for example of the European standard EN 50399:2011/A1 (2016), or may even not comply with such standard or some of them.

WO 2008071237 relates to a power transmission cable provided with a flame-retardant halogen free sheath comprising an inner and an outer layer. The cable can be a medium-voltage cable comprising three conductors and a bedding. The bedding is surrounded by an armour in form of copper braids. The armour is in turn surrounded by a sheath comprising an inner layer and an outer layer. The polymer material of the inner layer is ethylene vinyl acetate (EVA) and/or ethylene alkyl acrylate and is charged with a flame-retardant filler, for example magnesium hydroxide or aluminium hydroxide. The polymer material of the outer layer is ethylene alkyl acrylate and is charged with a flame-retardant filler similar to those of the inner layer.

U.S. Pat. No. 6,998,536 relates to a cable sheath, in particular for a telecommunications cable, for example a cable made up of a plurality of cable-cores surrounded by a sheath comprising at least one inner layer and an outer layer. The outer layer is made of a halogen-free flame-retardant composition containing a mixture of a polymer matrix and of at least one flame-retardant additive. The matrix is chosen from a polyethylene, an ethylene copolymer (EVA), and a mixture thereof. The additive is constituted by a first and a second inorganic compound, the first inorganic compound being referred to as a "phyllosilicate", such as a clay. Among such clays, it is possible to use montmorillonite, bentonite, beidellite, and a mixture thereof. The second inorganic compound can be a strong acid such as sulfuric acid.

US20050045368 relates to non-halogen wire and cable dual layer constructions with high levels of flame retardant useful as sheaths. The cable comprises an outer protective intumescent layer extruded over a non-halogen flame retardant polyolefin inner layer as a dual layer. The inner flame-retardant jacket comprises a polyolefin base resin (LLDPE, metallocene or single site) containing a non-halogen flame retardant additive such as magnesium hydroxide. The outer layer comprises a polypropylene base resin containing intumescent filler additives.

U.S. Pat. No. 7,504,451 relates to a polymer composition comprising a polymer and a synergistic flame-retardant additive combination which comprises a nano-clay and a second filler. The second filler could be a known flame retardant such as aluminum trihydroxide (ATH). Examples of suitable polymers include polyethylenes such as EVA. The compositions are said for use in cables for electrical transmission. The coating may be, for example, a sheath, jacket or insulation. Neither ATH nor nano-clay gave a strong enough char when used on their own. The results demonstrate that the only way to obtain a strong char is to use both together.

SUMMARY OF THE DISCLOSURE

A main object of the present disclosure is providing a medium voltage (MV) electric cable having improved performances against fire, particularly substantially no dripping (occurrence of flaming droplets) when exposed to high temperatures, e.g. in case of fire, so as to meet the stricter requirements for certification according to the current international standards in a class of such standards as high as possible.

Another object of the present disclosure is providing a MV electric cable as above which, in addition to exhibit substantially no dripping under fire, maintains good mechanical properties and is easily workable, particularly in extrusion processes.

The Applicant found that a MV electric cable exhibits improved properties under fire, particularly null dripping under fire, when it is provided with a filler layer surrounding and interpenetrating within metal wires of a conductive screen of the cable. The filler layer is made from an extruded elastomeric low smoke zero halogen (LSOH) polymeric composition comprising a polyethylene (PE) having a density lower than 0.93 g/cm$^3$ and a metal hydroxide. An outer sheath made from a composition comprising a polymer mixture of ethylene vinyl acetate (EVA) and a polyethylene having a density lower than 0.93 g/cm$^3$, added with a metal hydroxide and a phyllosilicate clay is provided in direct contact with the filler layer.

Accordingly, the present disclosure relates to a MV electric cable comprising:
- a conductor;
- an inner semi-conductive layer arranged in a radially outer position with respect to the conductor;
- an insulating layer arranged in a radially outer position with respect to the inner semi-conductive layer and directly contacting the inner semi-conductive layer;
- an outer semi-conductive layer arranged in a radially outer position with respect to the insulating layer and directly contacting the insulating layer;
- a wire metal screen arranged in a radially outer position with respect to the outer semi-conductive layer;
- a filler layer arranged in a radially outer position with respect to the wire metal screen and interpenetrating within the wire metal screen, the filler layer being made from an extruded elastomeric low smoke zero halogen (LSOH) composition comprising a polyethylene homopolymer and/or copolymer having a density lower than 0.93 g/cm$^3$ and a metal hydroxide; and
- an outer sheath arranged in a radially outer position with respect to the filler layer and directly contacting the filler layer, the outer sheath being made from a low smoke zero halogen (LSOH) composition comprising a polymer mixture of an EVA polymer and a polyethylene homopolymer and/or copolymer having a density lower than 0.93 g/cm$^3$, the polymer mixture being charged with a metal hydroxide and a phyllosilicate clay.

The Applicant found that a MV electric cable provided with a combination of a filler layer surrounding and interpenetrating a wire metal screen and an outer sheath (e.g. the outermost layer) made from the compositions as specified above, has improved reaction to fire with a substantially absence of dripping during burning which allow the cable to be certified to pass specific qualification standards in higher classes.

In addition, the Applicant found that the provision of a filler layer surrounding and interpenetrating a wire metal screen and an outer sheath as specified above allows to impart improved properties under fire, particularly no dripping under fire, to the cable without impairing its mechanical properties as well as easing the workability of the polymer material forming the filler layer and the outer sheath, particularly in the extrusion step.

BRIEF DESCRIPTION OF DRAWINGS

FIG. 1 illustrates an exemplary embodiment of a medium voltage electric cable.

DETAILED DESCRIPTION

For the purpose of the present description and of the appended claims, the words "a" or "an" should be read to include one or at least one and the singular also includes the plural unless it is obvious that it is meant otherwise. This is done merely for convenience and to give a general sense of the disclosure.

Within the present description and the subsequent claims, unless indicated otherwise, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated therein.

Moreover, in the present description, it is to be understood that the technical features described specifically above and below can be combined with each other in any way, constituting further embodiments of the present disclosure which may not be specifically described for conciseness, but which fall within the scope of the present disclosure.

In the present description and claims, unless specified otherwise, the amount of the components in the polymer compositions is given as percentage by weight on the total weight of the composition and/or in phr where the term "phr" is used to indicate parts by weight per 100 parts by weight of the base polymeric material.

The electric cable according to the disclosure can be used particularly but not exclusively for medium-voltage (MV) applications. In the present description and the appended claims, as "medium voltage" it is meant a voltage from 1 kV to 35 kV.

The cable of the present disclosure is particularly suitable to transport and distribute electric current in industrial facilities and public infrastructures.

Further features and advantages of the present disclosure will be made apparent by the following detailed description of some exemplary embodiments thereof, such description being provided merely by way of non-limiting example with reference to the attached FIG. 1 wherein a schematic cross-section view of a medium voltage electric cable according to the present disclosure is shown.

A MV electric cable 10 according to a non-limiting embodiment of the disclosure is shown in FIG. 1.

Cable 10 comprises a single core comprising a conductor 11 made of an electrically conductive material, e.g. aluminium, copper or composite thereof. The conductor 11 may be in the form of a solid bar or a of bundle of wires, for example a bundle of stranded wires. For example, the conductor 10 may comprises tinned stranded and compressed copper wires.

The core may include a single conductor or a plurality of conductors, wherein each conductor is surrounded by an insulating system (inner semiconductive layer+insulating layer+outer semiconductive layer) as described above and in the following.

The conductor 11 is electrically insulated by an insulating system comprising an inner semi-conductive layer 12 arranged in a radially outer position with respect to the conductor 11 and in direct contact thereto, an insulating layer 13 arranged in a radially outer position with respect to the inner semi-conductive layer 12 and in direct contact thereto, and an outer semi-conductive layer 14 arranged in a radially outer position with respect to the insulating layer 13 and in direct contact thereto.

The inner semi-conductive layer 12 mitigates peaks of electric field inside the cable 10 by uniformly distributing charges on the surface of the conductor 11. Furthermore, the inner semi-conductive layer 12 minimizes degradation of the insulating layer 13 by filling the gaps possibly formed between the conductor 11 and the insulating layer 13.

The insulating layer 13 electrically insulates the conductor 11 from outside so that current may not flow outside of the cable 10.

The outer semi-conductive layer 14 uniformly distributes electrical stress inside the insulation system.

Each of the layers 12, 13 and 14 forming the insulating system may be extruded. In an embodiment, the layers 12, 13 and 14 forming the insulating system are co-extruded.

The cable 10 further includes a conductive screen 15 made of metal wires and, in the present embodiment, of metal binder tape 15a radially external to the metal wires and in direct contact thereto. The conductive screen can be made of copper, aluminium, a copper alloy, an aluminium alloy or a combination thereof.

For example, the conductive screen 15 can be made of a tinned annealed copper wires and a copper binder tape. The conductive screen 15 can connect the cable 10 with the ground.

The cable 10 further includes a filler layer 16 arranged in a radially outer position with respect to the conductive screen 15, 15a.

According to the disclosure, the filler layer 16 is made from a LSOH composition comprising a polyethylene (PE) having a density lower than 0.93 g/cm$^3$ and a metal hydroxide. The filler layer 16 is extruded onto the conductive screen 15, for example by pressure extrusion, and enters and fills the gaps between the metal wires and metal binder tape 15a of the conductive screen 15.

The cable 10 further includes an outer sheath 17 arranged in a radially outer position with respect to the filler layer 16 and directly contacting the filler layer 16. According to the disclosure, the outer sheath 16 is made from a low smoke zero halogen (LSOH) polymer composition comprising a mixture of an ethylene vinyl acetate (EVA) and a polyethylene having a density lower than 0.93 g/cm$^3$, added with a metal hydroxide and a phyllosilicate clay.

The combination of filler layer 16 and outer sheath 17 made from the compositions specified above provides a barrier to propagation of the fire towards the innermost layers of the cable 10 and prevents the production of flaming droplets when exposed to high temperatures, e.g. in case of fire.

In the cable according to the present disclosure, the inner semi-conductive layer, the insulating layer and the outer semi-conductive layer (in the following also collectively referred to as "insulating system") can be made of polymeric material. Suitable polymeric materials include polyethylene homopolymers or copolymers, polypropylene polymers and blends thereof.

Examples of ethylene homopolymers or copolymers suitable for the inner semi-conductive layer (12), the insulating layer (13) and the outer semi-conductive layer (14) include polypropylene homopolymers and copolymers, medium density polyethylene (MDPE), low density polyethylene (LDPE), very low density polyethylene (VLDPE), ultra-low density polyethylene (ULDPE), copolymer of ethylene with one or more alpha-olefins having 3 to 12 carbon atoms, for example 4 to 8 carbon atoms, like ethylene-propylene rubber (EPR) or linear low density polyethylene (LLDPE), optionally, comprising a diene, such as ethylene/propylene/diene rubber (EPDM) copolymer. Examples of the alpha-olefins are propylene, 1-butene, 1-hexene, 4-methyl-1-pentene, and 1-octene. The material of the insulating system can be cross-linked, for example, by a peroxide cross-linking agent.

Examples of propylene-based materials are the propylene-based materials disclosed in WO 02/03398, WO 04/066317, WO 04/066318, WO 07/048422, WO11/092533 and WO 08/058572.

The semi-conductive layers material further comprises a suitable amount of a conductive filler, for example carbon black.

In the present description and claims as "semi-conductive layer" it is meant a layer made of a material having electrically semi-conductive properties, such as a polymeric matrix added with, e.g., carbon black such as to obtain a volumetric resistivity value, at room temperature, of less than 500 Q·m, for example less than 20 Q·m. The amount of carbon black can range between 1 and 50% by weight, for example between 3 and 30% by weight, relative to the weight of the polymer.

In an embodiment, the insulating layer of the cable of the disclosure is made of a cross-linked polyethylene (XLPE) or EPR.

According to the disclosure, the filler layer is made from an LSOH polymeric composition containing a polyethylene (PE) having a density lower than 0.93 g/cm$^3$ and a metal hydroxide.

Examples of polyethylene suitable for the polymeric composition of the present filler layer are polyethylene homopolymer or copolymer like low density polyethylene (LDPE), very low density polyethylene (VLDPE), ultra-low density polyethylene (ULDPE), linear low density polyethylene (LLDPE), ethylene-propylene rubber (EPR), ethylene/propylene/diene rubber (EPDM) or mixture thereof.

In an embodiment, polyethylene suitable for the polymeric composition of the present filler layer has a density lower than 0.91 g/cm$^3$, for example lower than 0.90 g/cm$^3$, as measured according to ASTM D792-08.

In an embodiment, the polymeric composition of the present filler layer comprises LLDPE as copolymer of polyethylene and a comonomer selected from butene, hexene or octene. LLDPE according to the present disclosure can be of manufactured by Ziegler-Natta or metallocene catalysts.

In an embodiment, the polymeric composition forming the filler layer comprises a mixture of LLDPE and EPR or EPDM as base polymers.

In an embodiment, the metal hydroxide is selected from magnesium hydroxide, aluminum hydroxide or a combination thereof. An example of metal hydroxide suitable for the polymeric composition forming the filler layer of the cable is magnesium hydroxide, of synthetic or natural origin (brucite), optionally surface treated.

The amount of metal hydroxide, such as magnesium hydroxide or aluminum hydroxide, in the LSOH polymeric composition forming the filler layer can higher than 400 phr, for example from 600 phr to 950 phr.

In an embodiment, the polymeric composition of the present filler layer comprises additives such as processing aids, lubricants, coupling agents and antioxidants.

Conventional antioxidants which are suitable for this purpose are by way of example: polymerized trimethyldihydroquinoline, 4,4'-thiobis (3-methyl-6-tert-butyl) phenol, pentaerythritol tetrakis [3-(3,5-di-tert.-butyl-4-hydroxyphenyl) propionate], 2,2'-thio-diethylene-bis-[3-(3,5-di-tert-butyl-4-hydroxy-phenyl) propionate] and the like or mixtures thereof.

Processing aids usually added to the base polymer are, for example, calcium stearate, zinc stearate, stearic acid, paraffin wax, silicone rubbers and the like, and mixtures thereof.

The lubricants used are, for example, paraffin waxes of low molecular weight, stearic acid, stearammide, oleammide, erucamide.

The coupling agent may be used with the aim of further improving compatibility between the inorganic fillers as indicated above and polymer matrix. This coupling agent can be selected from those known in the art, for example: saturated silane compounds or silane compounds containing at least one ethylenic unsaturation; peroxides or mixtures thereof. As an alternative, monocarboxylic acids or dicarboxylic acids anhydrides, optionally grafted onto the polymeric base, may be used.

The filler layer of the present disclosure made of the LSOH material indicated above is extruded onto the conductive screen and enters and fills the gaps between the metal wires and, if present, the metal bands of the conductive screen. In this way, the filler layer can aid to maintain the insulation properties and ensure operation of the cable for the desired time in case of fire by hindering the heat propagation towards the innermost layers of the cable.

According to the disclosure, the outer sheath of the cable is made from a low smoke zero halogen (LSOH) composition comprising a polymer mixture of EVA and a polyethylene having a density lower than 0.93 $g/cm^3$, the polymer mixture being filled with a metal hydroxide and a phyllosilicate clay.

In an embodiment, the LSOH composition forming the outer sheath is free of any intumescent material.

Examples of polyethylene suitable for the polymeric composition of the present outer sheath are like those above listed for the present filler layer.

In an embodiment, the polyethylene polymer in the polymeric composition of the present outer sheath has a density lower than 0.91 $g/cm^3$, as measured according to ASTM 792-08.

In an embodiment, the polyethylene polymer in the polymeric composition of the present outer sheath is a LLDPE.

The EVA polymer in the polymeric composition forming the outer sheath of the present cable can have an average content of vinyl acetate co-monomer of at least 15 wt %, for example from 15 wt % and 35 wt %. In the polymeric composition forming the present outer sheath, mixtures of EVA having different vinyl acetate content can be present.

In an embodiment, the ratio between the EVA polymer and the polyethylene polymer (polyethylene homopolymer and/or copolymer) in the polymeric composition forming the outer sheath is in the range from 9:1 to 1:1, for example in the range from 8:2 to 6:4.

In an embodiment, the metal hydroxide in the polymeric composition forming the outer sheath is selected from magnesium hydroxide, aluminum hydroxide, either of natural or synthetic origin, or a combination thereof. The amount of metal hydroxide, such as magnesium hydroxide or aluminum hydroxide, can be up to 190 phr, for example from 100 phr to 180 phr.

The phyllosilicate clay can be comprised in the polymeric composition forming the outer sheath of the cable in an amount from 1 to 15 phr, for example in an amount from 5 to 13 phr.

The phyllosilicate clay can be layered. The phyllosilicate clay can be selected from the group consisting of montmorillonite, bentonite, dellite, magadiite, saponite, laponite, sepiolite, attapulgite, hectorite, beidellite, vermiculite, kaolinite, nontronite, volkonskoite, stevensite, pyrosite, sauconite, kenyaite and combinations thereof.

The phyllosilicate clay may be naturally occurring or synthetic.

In a preferred embodiment, the phyllosilicate clay included in the polymeric composition forming the outer sheath of the cable is a montmorillonite or bentonite.

The phyllosilicate clay of the present outer sheath composition can be chemically modified, for example by salification with an ammonium salt such as dimethyl-dihydrogenated tallow ammonium chloride or dimethyl-benzyl-hydrogenated tallow ammonium chloride. The chemical modification by cationic coating allows increasing the compatibility of phyllosilicate clay with the polymeric matrix.

The phyllosilicate clay of the present outer sheath composition can have an average particle size dimensions (average particle size $d_{50}$) of from 5 to 20 μm.

In an embodiment, the polymeric composition of the present outer sheath comprises additives such as processing aids, lubricants, coupling agents and antioxidants, selected among the ones exemplified above for the filler layer.

Without wishing to be bound to such a theory, the inventors postulate that the phyllosilicate clay in combination with the metal hydroxide allows significantly increasing the strength of the char that forms during the combustion of the outer sheath polymeric material, e.g. in case of fire. In addition, the presence of a phyllosilicate clay in the polymeric composition forming the outer sheath allows reducing the amount of metal hydroxide used in the composition while maintaining the desired flame retardant properties, thereby preventing the mechanical properties of the polymer composition from deteriorating and maintaining good workability of the polymer composition forming the outer sheath in the extrusion process.

As the outer sheath is in direct contact with the underlying filler layer, the outer sheath and the filler layer bind one on the other forming an integral assembly which, in case of fire, allows the burnt outer sheath polymeric material to stay in place and to act as a barrier to the fire propagation inside the cable. At the same time, the outer sheath material carbonizes in a substantially uniform matter and creates a heat barrier preventing the temperature inside the cable to quickly and highly rise and the melted polymeric material of the integral assembly to move, thereby improving the resistance to dripping of the cable.

As shown in the examples, Applicant experienced that MV cables formed using the polymer compositions of the disclosure for the filler layer and for the outer sheath respectively exhibit no flaming droplet production (dripping) when exposed to high temperatures, e.g. in case of fire, without impairing other tested resistance to fire properties related to limited flame and toxic smoke production and spread, thereby allowing the cable to be certified to pass the stricter requirements for certification of current international standards, such as EN 50399:2011/A1 (2016), in higher classes.

The electric cable according to the present disclosure may be produced based on cable manufacturing techniques known to those skilled in the art. In particular, the inner insulating system, the filler layer and the outer sheath of the MV cable according to the present disclosure may be formed using conventional processes with a thickness chosen to comply requirements and needs of the particular application for the cable.

The present disclosure will now be described with reference to the following examples which are provided for purpose of illustration only and thus are not to be construed as limiting the scope of the present disclosure in any way.

Example 1

A sample of MV cable according to the disclosure (hereinafter referred to as Cable A) was prepared using a conventional extrusion process.

Cable A has a structure like the cable 10 shown in FIG. 1.

The insulating layer of Cable A was made of EPR.

The filler layer of cable A was made from a LSOH polymer composition comprising the components and related amounts as reported in the following Table 1.

TABLE 1

| Component | PHR | Wt % |
| --- | --- | --- |
| Polymer base A1 | 100 | 11.5 |
| Magnesium hydroxide | 804 | 85.3 |
| Additives | 38 | 3.2 |

Polymer base A1 = ethylene-octene copolymer (density: 0.87 g/cm$^3$)/ethylene-propylene diene polymer (density: 0.86 g/cm$^3$) 85:15.
Magnesium hydroxide = natural magnesium hydroxide with untreated surface and having an average particle size (d50) of about 5 mm.

The outer sheath of cable A was made from a LSOH composition comprising the components and related amounts as reported in the following Table 2.

TABLE 2

| Component | PHR | Wt % |
| --- | --- | --- |
| Polymer base B1 | 34.1 | 11.6 |
| Polymer base B2 | 65.9 | 22.5 |
| Phyllosilicate clay | 9.9 | 3.4 |
| Aluminium hydroxide | 170.5 | 58.2 |
| Additives | 12.5 | 4.3 |

Polymer base B1 = linear low density polyethylene (density: 0.90 g/cm$^3$).
Polymer base B2 = ethylene vinyl acetate (VA content: 27%)/ethylene vinyl acetate (VA content: 19%) 1:1.
Phyllosilicate clay = montmorillonite dimethyl-dihydrogenated tallow ammonium salt (particle size 7-9 μm)
Aluminium hydroxide = precipitated (synthetic) aluminium hydroxide with untreated surface and having an average particle size (d$_{50}$) of 1 mm.

Example 2 (Comparative)

A sample of a comparative MV cable (hereinafter referred to as Cable B) was prepared using a conventional extrusion process.

Cable B has a structure like Cable A of Example 1.

However, the insulating layer of Cable B was made of XLPE.

The filler layer of cable B was made from a LSOH composition as reported in Table 1 above.

The outer sheath of cable B was made from a LSOH composition comprising the components and related amounts as reported in the following Table 3.

TABLE 3

| Component | PHR | Wt % |
| --- | --- | --- |
| Polymer base C | 100 | 31.5 |
| Magnesium hydroxide | 204 | 64.12 |
| Additives | 13.9 | 4.38 |

Polymer base C = ethylene-octene copolymer (density: 0.88 g/cm$^3$)/linear low density polyethylene (density: 0.91 g/cm$^3$) 1:0.4.
Magnesium hydroxide = natural magnesium hydroxide with untreated surface and having an average particle size (d$_{50}$) of about 3-4 mm.

Example 3 (Comparative)

A sample of a comparative MV cable (hereinafter referred to as Cable C) was prepared using a conventional extrusion process.

Cable C has a structure which differs from the structure of Cable A of Example 1 in that the filler layer is absent. Therefore, in cable C, the outer sheath is in direct contact with the conductive screen.

The insulating layer of Cable C was made of XLPE.

The outer sheath of cable C was made from a LSOH composition comprising the components and related amounts as reported in following Table 4.

TABLE 4

| Component | PHR | Wt % |
| --- | --- | --- |
| Polymer base D | 100 | 45.9 |
| Magnesium hydroxide | 113.3 | 52.11 |
| Additives | 4.114 | 1.9 |

Polymer base D = ethylene-octene copolymer (density: 0.88 g/cm$^3$)/polyethylene (density: 0.94 g/cm$^3$) 1:0.6.
Magnesium hydroxide = natural magnesium hydroxide with untreated surface and having an average particle size (d50) of about 3 mm.

Example 4

Tests under fire conditions were carried out on cables A to C of Examples 1-3.

The set-up used for the tests under fire conditions is substantially that specified in the European standard EN 50399:2011/A1 (2016) and IEC 61034-2 (2005), which, according to the Table 4 of the Commission Delegated Regulation (EU) 2016/364 of 1 Jul. 2015, allows to determine, inter alia, the following parameters: Flame Spread (FS), Heat Release Rate (HRR), Total Heat Release (THR), Smoke Production Rate (SPR), Total Smoke Production (TSP), Fire Growth Rate Index (FIGRA) and duration of flaming droplets.

During the test, all the above cables were subjected to a flame test with 20.5 kW propane/air ignition source for 20 minutes.

The results of the tests are shown in the following Table 5 wherein comparative Cables B and C are marked with an asterisk.

TABLE 5

| Parameter | Cable A | Cable B* | Cable C* |
| --- | --- | --- | --- |
| FS (meters) | 0.64 | 0.79 | 0.8/0.82 |
| Peak HRR (KW) | 24.9 | 7.2 | 26.4/30.3 |
| Peak SPR (m$^2$/s) | 0.01 | 0.01 | 0.02 |
| THR (MJ) | 6.50 | 4.9 | 7.2/10.0 |
| TSP (m$^2$) | 5.20 | 4.3 | 11.3/13.4 |
| FIGRA (W/s) | 26.80 | 19.4 | 29.3/38.5 |
| Droplet | d0 | d2 | d1/d2 |
| Class | B2ca, s1, d0 | B2ca, s1, d2 | B2ca, s1, d1/Cca, s1, d2 |

From the above results, both Cable A according to the disclosure and comparative Cable B qualified as B2ca (low fire hazard cable) according to Table 4 of the Commission Delegated Regulation (EU) 2016/364 as having FS (Flame Spread)≤1.5 m;
THR (Total Heat Release)≤15 MJ;
Peak HRR (Heat Release Rate)≤30 kW; and
FIGRA (Fire Growth Rate Index)≤150 W/s.

Differently, cable C qualified as B2ca or Cca because the HRR peak also resulted to be slightly higher than 30 kW and ≤60 kW.

In addition, all the above Cables qualified as s1 because TSP≤50 m² and Peak SPR≤0.25 m²/s.

However, both comparative Cables B and C exhibited production of flaming droplets and Cable B qualified as d2 (flaming droplets/particles persisting longer than 10 sec within 1.200 sec) while Cable C qualified as d2 or d1 (no flaming droplets/particles persisting longer than 10 sec within 1.200 sec).

Surprisingly, Cable A which included a filler layer and an outer sheath made from compositions according to the disclosure exhibited no flaming droplets/particles within 1.200 sec and thereby it qualified as d0, i.e. in the highest class according to Table 4 of the Commission Delegated Regulation (EU) 2016/364. At the same time, the other tested resistance to fire properties related to limited flame and toxic smoke production and spread are maintained.

The invention claimed is:

1. A medium voltage electric cable comprising:
   a conductor;
   an inner semi-conductive layer arranged in a radially outer position with respect to the conductor;
   an insulating layer arranged in a radially outer position with respect to the inner semi-conductive layer and directly contacting the inner semi-conductive layer;
   an outer semi-conductive layer arranged in a radially outer position with respect to the insulating layer and directly contacting the insulating layer;
   a wire metal screen arranged in a radially outer position with respect to the outer semi-conductive layer;
   a single filler layer arranged in a radially outer position with respect to the wire metal screen and interpenetrating within the wire metal screen, the filler layer being made from an extruded elastomeric low smoke zero halogen composition comprising a polyethylene homopolymer and/or copolymer having a density lower than 0.93 g/cm? and a metal hydroxide; and
   an outer sheath arranged in a radially outer position with respect to the filler layer and directly contacting the filler layer, the outer sheath being made from a low smoke zero halogen (LSOH) composition comprising a polymer mixture of an EVA polymer and polyethylene homopolymer and/or copolymer having a density lower than 0.93 g/cm³, the polymer mixture being charged with a metal hydroxide and a phyllosilicate clay.

2. The electric cable according to claim 1, wherein the inner semi-conductive layer, the insulating layer and the outer semi-conductive layer are each made of an ethylene polymer or copolymer chosen from the group consisting of polypropylene copolymers, medium density polyethylene (MDPE), low density polyethylene (LDPE), very low density polyethylene (VLDPE), ultra-low density polyethylene (ULDPE), linear low density polyethylene (LLDPE), ethylene-propylene rubber (EPR), ethylene/propylene/diene rubber (EPDM) copolymers.

3. The electric cable according to claim 1, wherein the insulating layer is made of a crosslinked polyethylene or EPR.

4. The electric cable according to claim 1, wherein the LSOH composition forming the filler layer comprises LLDPE, EPR, EPDM or mixtures thereof.

5. The electric cable according to claim 1, wherein the LSOH composition forming the filler layer comprises a polyethylene homopolymer and/or copolymer having a density lower than 0.91 g/cm³.

6. The electric cable according to claim 1, wherein the amount of metal hydroxide in the LSOH composition forming the filler layer is higher than 400 phr.

7. The electric cable according to claim 1, wherein the ratio between the EVA polymer and the polyethylene homopolymer and/or copolymer in the LSOH composition forming the outer sheath is in the range from 9:1 to 1:1.

8. The electric cable according to claim 1, wherein the LSOH composition forming the outer sheath comprises LLDPE, EPR, EPDM or mixtures thereof.

9. The electric cable according to claim 1, wherein the amount of metal hydroxide in the LSOH composition forming the outer sheath is up to 190 phr.

10. The electric cable according to claim 1, wherein the metal hydroxide is selected from magnesium hydroxide, aluminum hydroxide or a combination thereof.

11. The electric cable according to claim 1, wherein the phyllosilicate clay is selected from the group consisting of montmorillonite, bentonite, dellite, magadiite, saponite, laponite, sepiolite, attapulgite, hectorite, beidellite, vermiculite, kaolinite, nontronite, volkonskoite, stevensite, pyrosite, sauconite, kenyaite and combinations thereof.

12. The electric cable according to claim 1, wherein the phyllosilicate clay is a montmorillonite having average particle size dimensions of from 5 to 20 μm.

13. The electric cable according to claim 1, wherein the amount of phyllosilicate in the polymeric composition forming the outer sheath is from 1 to 15 phr.

14. The electric cable according to claim 1, wherein the LSOH composition forming the outer sheath is free of any intumescent material.

15. The electric cable according to claim 1, wherein the ratio between the EVA polymer and the polyethylene homopolymer and/or copolymer in the LSOH composition forming the outer sheath is in the range from 8:2 to 6:4.

16. The electric cable according to claim 1, wherein the amount of phyllosilicate in the polymeric composition forming the outer sheath is from 5 to 13 phr.

* * * * *